United States Patent [19]

Abe et al.

[11] Patent Number: 4,722,846
[45] Date of Patent: Feb. 2, 1988

[54] NOVEL VARIANT AND PROCESS FOR PRODUCING LIGHT COLORED SOY SAUCE USING SUCH VARIANT

[75] Inventors: Keietsu Abe; Hironaga Hashiba, both of Noda; Kinji Uchida, Nagareyama, all of Japan

[73] Assignee: Kikkoman Corporation, Noda, Japan

[21] Appl. No.: 720,265

[22] Filed: Apr. 5, 1985

[30] Foreign Application Priority Data

Apr. 18, 1984 [JP] Japan .................................. 59-76709
Sep. 25, 1984 [JP] Japan ................................ 59-198631

[51] Int. Cl.$^4$ ............................................ A23L 1/238
[52] U.S. Cl. ...................................... 426/46; 426/52; 426/589; 426/634; 435/41
[58] Field of Search .................... 426/46, 52, 589, 634; 435/41

[56] References Cited

U.S. PATENT DOCUMENTS 4,308,284 12/1981 Noda et al. ........................ 426/52 X

FOREIGN PATENT DOCUMENTS 1009797  1/1976  Japan ..................................... 426/46
0078564  5/1983  Japan ..................................... 426/46
0175472 10/1983  Japan ..................................... 426/46

OTHER PUBLICATIONS

Proceedings of the 10th Symposium on Brewage, The Japan Brewage Assc., Sep. 13–14, 1978.

Primary Examiner—Raymond N. Jones
Assistant Examiner—Marianne M. Cintins
Attorney, Agent, or Firm—Banner, Birch, McKie and Beckett

[57] ABSTRACT

A novel variant belonging to the genus Pediococcus which does not cause fermentation of D-glucose but causes fermentation of pentose, and a process for producing a light-colored soy sauce which comprises adding the variant in the koji preparation step or in the early stage of brewing of soy sauce moromi.

6 Claims, No Drawings

NOVEL VARIANT AND PROCESS FOR PRODUCING LIGHT COLORED SOY SAUCE USING SUCH VARIANT

BACKGROUND OF THE INVENTION

1. Field of the Invention

This invention relates to a novel variant and a process for producing a light-colored soy sauce by using such microorganism.

2. Description of the Prior Art

Soy sauce, which is a time-honored all-purpose seasoning in Japan, has lately a tendency toward low salinity and lighter color, and the so-called usukuchi soy sauce which has hitherto been used by preference in the Kansai area of Japan is gradually gaining popularity even in the Kanto area. It is expected that such tendency will keep on in both soy sauce for domestic use and that used for processed foods.

The peculiar color and gloss of soy sauce result from an aminocarbonyl reaction between amino acids or peptides existing abundantly in the soy sauce moromi mash and sugars such as hexose, pentose, etc. The amount of said pentose existing in soy sauce moromi is only about 1/10 of the amount of hexose, but it is considered that pentose has an extremely high browning reactivity, with its contribution to such browning reaction being figured to be about 40–50%.

SUMMARY OF THE INVENTION

In view of these facts, the present inventors have made extensive studies for obtaining a variant having, in the production of soy sauce, the specific property of not causing fermentation of D-glucose but causing fermentation of pentose from a microorganism belonging to *Pediococcus halophilus*, and as a result, the inventors have succeeded in obtaining the objective variant.

The present inventors have made further researches on the process for producing a light colored soy sauce and found that when said variant is added in the koji preparation step and the obtained koji is charged into the soy sauce moromi mash and cultured or the soy sauce moromi in the early stage of brewing is inoculated with said variant to let it play an active part in the moromi, there takes place selective metabolization and consumption of pentoses such as L-arabinose and D-xylose in the soy sauce moromi which play an essential role in browning reaction of soy sauce, and there resultantly can be obtained a soy sauce which is light-colored and also appreciably improved in color and gloss stability in comparison with the conventional commercialized soy sauces.

From the above findings, the present invention has been accomplished.

An object of this invention is to provide a novel variant belonging to *Pedicoccus halophilus* which does not cause fermentation of D-glucose.

Another object of the invention is to provide a process for producing a light-colored soy sauce by using said novel variant belonging to the genus Pediococcus which does not cause fermentation of D-glucose but causes fermentation of pentose, said variant being added at any time in the koji preparation step or in the period soon or not long after charging of soy sauce moromi in the soy sauce production process.

DETAILED DESCRIPTION OF THE INVENTION

This invention will be described below in more detail.

Generally, soy sauce is produced by inoculating a mixture of cooked and denatured soybean and parched and crushed wheat with a seed koji, culturing it to obtain a shoyu (soy sauce) koji, charging the koji together with saline water into a tank, and fermenting and maturing the mixture for a period of 4 to 8 months. Ordinarily, lactic acid bacteria and yeasts in the moromi are supplied from the natural sources, but in the present invention, quite characteristically, a microorganism belonging to *Pediococcus halophilus* which does not cause fermentation of D-glucose but causes fermentation of pentoses such as L-arabinose and D-xylose is added at any suitable time in the koji-preparing step or in the early stage of brewing of moromi to let said microorganism perform its action in the moromi.

Any microorganism which belongs to the genus Pediococcus and which does not cause fermentation of D-glucose but causes fermentation of pentose can be used in this invention, and a typical example of such microorganism is *Pediococcus halophilus* 13–2.

*Pediococcus halophilus* 13–2 is a novel variant obtained by the present inventors by mutating *Pediococcus halophilus* X-160 which the present inventors have newly separated from the soy sauce moromi in the course of their studies. Bacteriological properties of *Pediococcus halophilus* X-160 and *Pediococcus halophilus* 13–2 are as described below. These bacteriological properties were determined according to the method shown in Bergey's Manual of Determinative Bacteriology, 1974, 8th Ed.

Bacteriological properties of *Pediococcus halophilus* X-160:

(a) Morphology (The bacterium was subjected to standing culture at 30° C. for 72 hours in a bouillon medium added with 1.0% (w/v) of xylose, 0.5% (w/v) of yeast extract and 5% (w/v) of common salt)

(1) Shape and size of cell: It is a coccus having a diameter of 0.6–0.8 microns. It forms tetrad sometimes occurs in pair.
(2) Polymorphism of cell: There is observed no polymorphism.
(3) Motility: No motility.
(4) Spore: It forms no spore.
(5) Gram-stain: Positive
(6) Acid fastness: None

(b) State of growth in various media (1) Bouillon-agar plate culture:

It does not grow on the surface but grows in the inside and forms white pin-head colonies. No pigment is produced.

(2) Bouillon-agar slant culture:

No growth on the surface.

(3) Bouillon submerged culture:

When it begins to grow, it causes entire uniform turbidity and then forms a white sediment. No growth is observed on the surface.

(4) Bouillon-gelatin stab culture:

It grows uniformly along the stab holes. Gelatin is not liquefied.

(5) Litmus milk:

Neutral. Temporarily decolored.

(c) Physiological properties (1) Reduction of nitrates: Not observed.
(2) Denitrification reaction: Negative.
(3) MR test: Negative.
(4) VP test: Negative.
(5) Indole formation: Not observed.
(6) Hydrogen sulfide formation: Not observed.
(7) Hydrolysis of starch: Not observed.
(8) Utilization of citric acid: Not observed.
(9) Utilization of inorganic nitrogen source: Not observed.
(10) Pigment formation: Not observed.
(11) Urease: Negative.
(12) Oxidase: Negative.
(13) Catalase: Negative.
(14) Range of condition for growth:

It grows in the pH range of 5.5-9.0, the optimum pH being 7.0. It grows well in the temperature range of 20°-30° C. Growth is inhibited at temperatures above 45° C.

(15) Behavior to oxygen:

It is a facultative anaerobe and grows better in an anaerobic condition.

(16) O-F test (by addition of yeast extract): Fermentative.

(17) Formation of acids and gases from sugars:

|  | Formation of acid | Formation of gas |
|---|---|---|
| (1) L-arabinose | + | − |
| (2) D-xylose | + | − |
| (3) D-glucose | + | − |
| (4) D-mannose | + | − |
| (5) D-fructose | + | − |
| (6) D-galactose | + | − |
| (7) Maltose | + | − |
| (8) Sucrose | + | − |
| (9) Lactose | − | − |
| (10) Trehalose | + | − |
| (11) D-sorbitol | − | − |
| (12) D-mannitol | − | − |
| (13) Inositol | − | − |
| (14) Glycerol | + | − |
| (15) Starch | − | − |

(d) Other properties (1) Decomposition products of sugars: Lactic acid and acetic acid are produced.

(2) Decomposition of arginine: It does not decompose arginine.

(3) Sodium chloride tolerance: It grows best in a medium containing 5-6% of sodium chloride. It also grows with 20% sodium chloride and shows a high halotolerance.

The newly separated strain of this invention is recognized to belong to Pediococcus halophilus because it has a strong tolerance for sodium chloride and grows in the pH range of 5.5-9.0.

This strain, however, is obviously different from other known strains belonging to Pediococcus halophilus as it is capable of simultaneously assimilating both pentose such as xylose, arabinose, etc., and glucose when both of them coexist, and thus this strain was judged to be a new strain belonging to Pediococcus halophilus.

Incidentally, Pediococcus halophilus X-160 has been deposited in Fermentation Research Institute, Agency of Industrial Science and Technology, Japan, under FERM BP-701. Bacteriological properties of Pediococcus halophilus 13-2:

The bacteriological properties of Pediococcus halophilus 13-2 totally coincide with those of Pediococcus halophilus X-160 shown above except for the item (17) concerning formation of acids and gases from sugars, which is as follows:

|  | Formation of acid | Formation of gas |
|---|---|---|
| (1) L-arabinose | + | − |
| (2) D-xylose | + | − |
| (3) D-glucose | − | − |
| (4) D-mannose | − | − |
| (5) D-fructose | + | − |
| (6) D-galactose | − | − |
| (7) Maltose | − | − |
| (8) Sucrose | − | − |
| (9) Lactose | − | − |
| (10) Trehalose | − | − |
| (11) D-sorbitol | − | − |
| (12) D-mannitol | − | − |
| (13) Inositol | − | − |
| (14) Glycerol | − | − |
| (15) Starch | − | − |

As this Pediococcus halophilus 13-2 had the property that it did no cause fermentation of glucose, it was different from other known strains belonging to Pediococcus halophilus and was thus judged to be a new variant belonging to Pediococcus halophilus.

This Pediococcus halophilus 13-2 has been deposited in Fermentation Research Institute, Agency of Industrial Science and Technology, Japan, under FERM P-7583, at the date of Apr. 11, 1984, and redeposited under FERM BP-702 in compliance with Budapest Treaty on The International Recognition of the Deposit of Microorganism, at the date of Jan. 24, 1985.

For said mutating treatment, there can be employed various methods such as use of a mutation-inducing agent such as N-methyl-N'-nitro-N-nitrosoguanidine, ethylmethane sulfonate, methylmethane sulfonate and the like, ultraviolet-light irradiation, X-ray irradiation, radiant ray irradiation, etc.

As the medium for culturing the microorganism belonging to the genus Pediococcus and having no D-glucose fermentability but having pentose fermentability, one may employ the media used for the culture of ordinary strains belonging to Pediococcus halophilus provided that such media contain L-arabinose and/or D-xylose.

As the nitrogen source for the medium, there can be used all nitrogen compounds available for the purpose or the materials containing them, such as yeast extract, peptone, meat extract, corn steep liquor, amino acids, exudate of soybean or wheat koji, and the like, and these nitrogen sources can be used either independently or in admixture. One or more of suitable inorganic salts such as manganese, phosphoric acid, potassium, magnesium, calcium and the like is added to said nitrogen source, and if necessary, a carbon source(s) necessary for the growth of the bacterium such as sugars, various kinds of organic or inorganic matters, vitamins, etc., are further added to provide a favorite medium. It is also preferred to contain 2-17% of common salt in the medium. Also, a moromi mash of early brewing stage in the ordinary soy sauce production process can be used by properly diluting it to a salt content of about 15%.

The cultivation of the microorganisms of the present invention is favorably carried out in a liquid medium under a stationary or an anaerobic condition.

The incubation temperature used in this invention is 20°-32° C., preferably 30° C. The incubation period is 2-5 days, preferably 4 days. The pH during the incubation is preferably maintained in the range of 6-8 in both synthetic medium (such as MYP medium or YPG medium) and moromi mash medium.

Any suitable means can be used for collecting the objective microorganism from the thus obtained culture. For instance, it is separated from the culture by a usual means such as centrifugal separation, filtration, etc., and washed if necessary.

The thus obtained microorganism of this invention or the culture containing such microorganism is added at any time in the koji preparation step or in the period soon or not long after charging of soy sauce moromi.

In case of adding said microorganism or the culture containing it in the koji preparation step, the timing of addition is not specified, but it is preferred to add it at the time when koji is just about to be formed. In case of inoculating the moromi with said microorganism, such inoculation is made during the period from the time of charging of moromi till about 60 days thereafter and prior to the formation of alcohol by yeast.

The pH of shoyu moromi lowers with the lapse of time after charging, reaching the level of 5.3-5.2 when the alcoholic fermentation begins, but since the Soy pediococcus is more active at a higher pH, it is desirable to add the microorganism before the moromi pH becomes lower than 5.5, and for this reason, such addition is preferably made during the period from the time just after charging to about 20 days thereafter.

The amount of the present microorganism to be added is preferably in the range of $10^2$-$10^9$ cells/g, but in case other spontaneously occurring Soy pediococci exist in the moromi, it is necessary to add the microorganism in a (cell) number at least equal to, preferably 10 times or more the cell number of such spontaneous Soy pediococci to allow full play of the microorganism.

The koji obtained by adding said microorganism in the koji preparation step is charged in the usual way or said microorganism is added to the shoyu moromi and then subjected to the same treatment as with the halo-tolerant lactic bacteria in ordinary shoyu moromi to effect assimilation of pentose in the moromi and simultaneous lactic acid fermentation. During this period, it is preferred to stir the moromi mixture periodically at intervals of several days to keep the moromi homogeneous.

After lactic acid fermentation, the moromi is subjected to alcoholic fermentation and maturing in the totally same way as ordinary shoyu moromi. For instance, when the moromi pH dropped to around 5, the moromi is added with so called alcoholic fermentation yeast: *Saccharomyces rouxii* to undergo alcohol fermentation and matured. In this way, it is possible to obtain a light-colored soy sauce with a flavor superior to conventional brands of soy sauce.

Needless to say, the light-colored soy sauce obtained according to this invention can be used in blend with ordinary koikuchi (dark-colored) soy sauce.

The novel variant of this invention can specifically assimilate L-arabinose and D-xylose alone among the saccharides, so that its use is effective for selectively removing L-arabinose and D-xylose which play a major role in browning and darkening soy sauce from the soy sauce moromi or soy sauce.

Accordingly, the soy sauce produced by using the present variant in the brewing is light-colored with a fine gloss, and even if preserved for a long time, it keeps free of darkening of its color and gloss. Thus, the variant according to this invention is of great industrial utility.

The present invention will be described in further detail by way of the embodiments thereof, but the invention is not limited thereto.

EXAMPLE 1

Induction of glucose metabolizability defective mutant:

A culture medium of the composition shown in Table 1 below (hereinafter referred to as MYPX-1-5), 5 ml in amount, was inoculated with *Pediococcus halophilus* X-160 (FERM BP-701), followed by standing culture thereof at 30° C. for 4 days to obtain a culture product.

TABLE 1

| Meat extract | 1 g/100 ml |
|---|---|
| Polypeptone | 1 g/100 ml |
| Yeast extract | 1 g/100 ml |
| Sodium thioglycolate | 0.1 g/100 ml |
| NaCl | 5 g/100 ml |
| Xylose | 1 g/100 ml |

Said culture product was centrifuged in the usual way at 18,000 r.p.m. for 10 minutes to obtain the bacterial cells and these bacterial cells were washed twice with a 0.1 M tris-malate buffer solution (pH 6.0) containing 5% of NaCl (this buffer solution is hereinafter referred to as TM buffer solution), and the washed bacterial cells were suspended in 5 ml of TM buffer solution to a bacterial cell concentration of $10^8$ cells/ml. Then N-methyl-N'-nitro-N-nitrosoguanidine was mixed in said suspension to a concentration of 100 μg/ml and acted thereto at 30° C. for 30 minutes.

Thereafter, the suspension was diluted 100 times with TM buffer solution, and 100 μl of the diluted suspension was inoculated into 4.9 ml of MYPX-1-5 for conducting standing culture at 30° C. for 4 days and the resulting culture product was centrifuged in the usual way at 18,000 r.p.m. for 10 minutes to obtain the bacterial cells. These bacterial cells were washed twice with a 5% aqueous NaCl solution and inoculated into 5 ml of a medium of the composition shown in Table 2 below (hereinafter referred to as chemically defined medium) to have an Ampicillin concentration of 10 μg/ml and a D-cycloserine concentration of 500 μg/ml for conducting standing culture at 30° C. for 48 hours. The resulting culture product was diluted with a 5% aqueous NaCl solution to a concentration of $10^3$ cells/ml to obtain a diluted suspension.

TABLE 2

| D,L-alanine | 200 mg/l |
|---|---|
| D,L-aspartic acid | 500 mg/l |
| Sodium L-glutamate | 500 mg/l |
| L-arginine | 200 mg/l |
| L-lysine hydrochloride | 200 mg/l |
| L-histidine | 100 mg/l |
| D,L-isoleucine | 200 mg/l |
| D,L-methionine | 200 mg/l |

TABLE 2-continued

| | |
|---|---|
| D,L-phenylalanine | 200 mg/l |
| L-proline | 100 mg/l |
| D,L-threonine | 200 mg/l |
| L-tyrosine | 100 mg/l |
| D,L-valine | 200 mg/l |
| D,L-tryptophane | 100 mg/l |
| L-cystein | 100 mg/l |
| D,L-serine | 100 mg/l |
| Glycine | 100 mg/l |
| D,L-leucine | 200 mg/l |
| Sodium chloride | 50 g/l |
| Sodium acetate trihydrate | 33 g/l |
| Monopotassium hydrogen-phosphate | 500 mg/l |
| Magnesium sulfate heptahydrate | 200 mg/l |
| Iron sulfate heptahydrate | 10 mg/l |
| Manganese sulfate tetrahydrate | 10 mg/l |
| Ammonium chloride | 3 g/l |
| Adenine sulfate | 10 mg/l |
| Uracil | 10 mg/l |
| Xanthine | 10 mg/l |
| Riboflavin | 2 mg/l |
| Thiamine | 1 mg/l |
| p-amino-benzoic acid | 1 mg/l |
| Pyridoxine hydrochloride | 1 mg/l |
| Calcium D,L-pantothenate | 1 mg/l |
| Nicotinic acid | 1 mg/l |
| Biotin | 10 γ/l |
| Folic acid | 10 γ/l |
| Choline | 2 mg/l |
| Inositol | 2 mg/l |
| Folinic acid | 10 γ/l |
| Ampicillin | 10 mg/l |
| D-cycloserine | 500 mg/l |
| Glucose | 10 g/l |
| pH 7.0 | |

A medium of the composition shown in Table 3 below (hereinafter referred to as MYPG-1-5 CaCO3 plate) was inoculated with 100 μl of said diluted suspension and subjected to anaerobic culture by using a GasPack (manufactured by BBL Microbiology Systems Co.) at 30° C. for 9 days, and the bacterial cells obtained from the halo-free colonies were subjected to replica plating with a medium of the composition shown in Table 4 below (hereinafteer referred to as MYPX-1-5 CaCO3 plate) and MYPG-1-5 CaCO3 plate, followed by standing culture at 30° C. for 9 days.

TABLE 3

| | |
|---|---|
| Meat extract | 0.5 g/100 ml |
| Yeast extract | 0.5 g/100 ml |
| Polypeptone | 0.5 g/100 ml |
| Sodium thioglycolate | 0.1 g/100 ml |
| Calcium carbonate | 0.5 g/100 ml |
| Agar | 1.5 g/100 ml |
| Glucose | 1.0 g/100 ml |
| pH 7.0 | |

TABLE 4

| | |
|---|---|
| Meat extract | 0.5 g/100 ml |
| Yeast extract | 0.5 g/100 ml |
| Polypeptone | 0.5 g/100 ml |
| Sodium thioglycolate | 0.1 g/100 ml |
| Calcium carbonate | 0.5 g/100 ml |
| Agar | 1.5 g/100 ml |
| Xylose | 1.0 g/100 ml |
| pH 7.0 | |

From the thus obtained replicas, the colonies forming halos with MYPX-1-5 CaCO3 plate but forming no halo with MYPG-1-5 CaCO3 plate were selected, and the bacterial cells obtained from the colonies having such properties on MYPX-1-5 CaCO3 plate were inoculated into 5 ml of MYPX-1-5 and subjected to standing culture at 30° C. for 4 days to obtain a culture product.

This culture product was centrifuged in the usual way at 18,000 r.p.m. for 10 minutes and the obtained bacterial cells were washed twice with a 5% aqueous NaCl solution and suspended in 5 ml of a 5% aqueous NaCl solution. The suspension was put into a Petri dish and irradiated with a 15-watt UV lamp at a distance of 28.5 cm from the dish for 30 seconds.

Then 4.9 ml of MYPX-1-5 was inoculated with 100 μl of said UV irradiated suspension for carrying out standing culture at 30° C. for 4 days, and the resulting culture product was centrifuged in the usual way at 18,000 r.p.m. for 10 minutes to obtain the bacterial cells. These bacterial cells were washed twice with a 5% aqueous NaCl solution and the whole of the washed bacterial cells were inoculated into 5 ml of chemically defined medium and subjected to 48-hour standing culture at 30° C. to obtain a culture product.

The thus obtained culture product was inoculated into MYPG-1-5 CaCO3 plate and subjected to anaerobic culture by using said GasPack at 30° C. for 9 days, and the bacterial cells were obtained from the colonies forming no halo on said plate. Further, replica plating was carried out with MYPX-1-5 CaCO3 plate and MYPG-1-5 CaCO3 plate, and the colonies forming halos on MYPX-1-5 CaCO3 plate but forming no halo on MYPG-1-5 CaCO3 plate were selected and the bacterial cells obtained from the colonies having such properties on MYPX-1-5 CaCO3 plate were inoculated into MYPX-1-5 and a medium of the composition shown in Table 5 below (hereinafter referred to as MYPG-1-5), both being 5 ml in amount, and subjected to standing culture at 30° C. for 4 days, thereby obtaining a novel variant Pediococcus halophilus 13-2 (FERM BP-702) which grows in MYPX-1-5 but cannot grow in MYPG-1-5.

TABLE 5

| | |
|---|---|
| Meat extract | 1 g/100 ml |
| Polypeptone | 1 g/100 ml |
| Yeast extract | 1 g/100 ml |
| Sodium thioglycolate | 0.1 g/100 ml |
| NaCl | 5 g/100 ml |
| Glucose | 1 g/100 ml |

Said MYPX-1-5 (5 ml) was inoculated with one platinum loop of said new variant Pediococcus halophilus 13-2 (FERM BP-702) to carry out standing culture at 30° C. for 4 days to obtain a culture product. This culture product was centrifuged in the usual way at 18,000 r.p.m. for 10 minutes and the obtained bacterial cells were washed with a 5% aqueous NaCl solution and then dried in the usual way to obtain 0.865 mg of dry cells.

EXAMPLE 2

100 kg of cooked and denatured defatted soybean and 105 kg of parched and crushed wheat were mixed and the mixture was inoculated with a seed koji and processed into a koji with aeration for 42 hours. To the thus obtained shoyu koji was added 360 liters of saline water containing 90 kg of common salt, said saline water having been cooled to 15° C., and the mixture (moromi mash) was charged into a 600-litre-capacity closed treating tank. Also, a culture solution obtained by incubating the culture containing Pediococcus halophilus 13-2 (FERM BP-702) obtained in Example 1 in a medium of the composition shown in Table 6 below by a 30° C. 5-day standing culture was added to said moromi mash so that the viable count would become 1×10⁵ cells per gram of moromi. The moromi pH was 5.9.

TABLE 6

| | |
|---|---|
| Meat extract | 1 g/100 ml |
| Polypeptone | 1 g/100 ml |
| Yeast extract | 1 g/100 ml |
| Sodium thioglycolate | 0.1 g/100 ml |
| NaCl | 15 g/100 ml |
| Xylose | 1 g/100 ml |

The moromi mash was stirred intermittently and heating was started from the 14th day after charging. At the 60th day after charging, *Saccharomyces rouxii* was added to a concentration of 1×10⁵ cells per gram of moromi, followed by the usual processing for 6 months to obtain a matured moromi. This matured moromi was compressed in the usual way, adjusted to 17.0% NaCl and 1.57% T.N. (Total nitrogen), and then heated at 80° C. for 4 hours to obtain a heat-treated soy sauce (the product of this invention).

A similar soy sauce (control product) was obtained in the same way as described above except that the bacterial cells were obtained in the usual way from a culture solution prepared by inoculating a medium of the composition shown in Table 7 below with *Pediococcus halophilus* IAM 1674 (supplied from the Institute of Applied Microbiology, Tokyo University) instead of *Pediococcus halophilus* 13-2 and subjecting it to 5-day standing culture at 30° C. and these bacterial cells, after washing, were added to the moromi mash at a rate of 1×10⁵ cells per gram of moromi.

TABLE 7

| | |
|---|---|
| Meat Extract | 1 g/100 ml |
| Polypeptone | 1 g/100 ml |
| Yeast extract | 1 g/100 ml |
| Sodium thioglycolate | 0.1 g/100 ml |
| NaCl | 15 g/100 ml |

TABLE 7-continued

| | |
|---|---|
| Glucose | 1 g/100 ml |

Said heat-treated soy sauces were subjected to ordinary analyses according to the "Standard Shoyu Analyses" (Nippon Shoyu Gijutsu Kai) (excepting tincture, xylose content and arabinose content), while the xylose content and arabinose content in the raw soy sauce were analyzed according to the method shown in M. Sinner and J. Puls: J. Chromatogr., Vol. 156, p. 197 (1978). The results are shown in Table 8.

Said heat-treated soy sauces were also subjected to an organoleptic test by a 28-member panel according to the triangular system, the results being shown in Table 9.

TABLE 8

| | | | | | | Items | | | | |
|---|---|---|---|---|---|---|---|---|---|---|
| | | | | | | Xylose content | Arabinose content | Tincture* | | |
| Sample | NaCl | Total nitrogen | Reducing sugar | Alcohols | pH | (mg/ml) | (mg/ml) | 1 | 2 | 3 |
| This invention | 17.0 | 1.57 | 260 | 2.65 | 4.77 | 0.915 | 1.762 | 0.60 | 1.82 (1.22) | 2.87 (1.05) |
| Control | 17.0 | 1.57 | 260 | 2.61 | 4.76 | 2.003 | 3.148 | 0.90 | 2.43 (1.53) | 3.70 (1.27) |

(Note)
Tincture was indicated by O.D. value obtained by centrifuging the soy sauce sample, diluting the supernatant 10 times with distilled water, measuring the absorbance at 550 nm by a Gilford's spectrophotomer and multiplying the measured value by the dilution rate. Tincture 1 indicates the tincture of the raw soy sauce, 2 the tincture of the heat-treated soy sauce, and 3 the tincture as determined by pouring 10 ml of the heat-treated soy sauce into a 15 mm-diameter test tube and keeping it in the rubber stoppered test tube at 30° C. for 7 days. The figures in the parentheses are ΔO.D. at 550 nm of the raw or heat-treated soy sauce.

TABLE 9

| | | Discrimination test | | Preference test | |
|---|---|---|---|---|---|
| | Sample | Number of persons who gave definite answer | Significant difference | Number of persons who showed preference | Significant difference |
| Flavor | Product of this invention | 10 | None | 6 | None |
| | Control product | | | 4 | |
| Taste | Product of this invention | 9 | None | 4 | None |
| | Control product | | | 5 | |

As seen from Table 9, the soy sauce produced by adding *Pediococcus halophilus* 13-2 (product of this invention) has no significant difference in flavor and taste from the soy sauce produced by adding a known strain (control product), but the former is lower by about 30% than the latter in tincture of raw soy sauce as shown in Table 8. Also, the product of this invention is superior in color stability in heating (ΔO.D. of color gloss 2) and color stability in exposure to air (ΔO.D. of color gloss 3).

What is claimed is:

1. A process for producing a light-colored soy sauce which comprises adding a microorganism belonging to the genus Pediococcus to a raw mash in a koji-preparing step or after having charged soy sauce moromi, said microorganism being *Peidococcus halophilus* 13-2 (FERM BP-702) which is unable to ferment D-glucose while being able to ferment pentoses.

2. The process for producing a light-colored soy sauce according to claim 1, wherein the pentoses are L-arabinose and D-xylose.

3. The process for producing a light-colored soy sauce according to claim 1, wherein the microorganism is added in the koji preparation step at the time when the formation of koji has been almost completed.

4. The process for producing a light-colored soy sauce according to claim 1, wherein the microorganism is added during the period from the time of charging of moromi till about 60 days thereafter and prior to the formation of alcohol by yeast.

5. The process for producing a light-colored soy sauce according to claim 1, wherein the microorganism is added during the period from the time just after charging of moromi till about 20 days thereafter.

6. The process for producing a light-colored soy sauce according to claim 1, wherein the microorganism is added in an amount of $10^2$–$10^9$ cells/g.

* * * * *